United States Patent [19]

Sewerinson

[11] Patent Number: 4,479,256
[45] Date of Patent: Oct. 23, 1984

[54] TWO PILOT FREQUENCY CONTROL FOR COMMUNICATION SYSTEMS

[75] Inventor: Ake N. Sewerinson, Port Coquitlam, Canada

[73] Assignee: AEL Microtel, Limited, Burnaby, Canada

[21] Appl. No.: 432,497

[22] Filed: Oct. 4, 1982

[51] Int. Cl.$^3$ .............................................. H04B 1/16
[52] U.S. Cl. .................... 455/265; 455/71; 455/260; 455/51; 331/10
[58] Field of Search ...................... 455/12, 51, 71, 258, 455/260, 265, 75; 375/113, 119, 120; 331/2, 10

[56] References Cited

U.S. PATENT DOCUMENTS

| | | | |
|---|---|---|---|
| 3,370,235 | 2/1968 | Miyagi | 455/12 |
| 3,450,842 | 6/1969 | Lipke | |
| 3,626,426 | 12/1971 | Steinberg | 455/260 |
| 4,188,579 | 2/1980 | Yoshisato | |
| 4,191,923 | 3/1980 | Schelisch | 455/12 |

Primary Examiner—Jin F. Ng
Attorney, Agent, or Firm—Leonard R. Cool

[57] ABSTRACT

Apparatus for synchronizing the frequency of locally generated pilot signals with those of remotely generated pilot signals where frequency errors are introduced during transmission. A pair of demodulated pilot signals F1' and F2' are filtered and mixed to derive a third signal having a frequency equal to F2'−F1'. The difference frequency has no frequency error component so the third signal is used in a phase locked loop to regenerate a reference frequency (fr) signal.

Two methods are disclosed to extract a control signal which is proportional to the error frequency. In one embodiment one of the received pilots (F1') is divided in frequency by 1/k1 and then subtracted from fr to yield 1/k1 times the error frequency df. By integrating this signal it becomes usable as an AFC signal to control a local oscillator.

In a second embodiment a signal having a frequency equal to the sum of the received pilot signals (F1'+F2') is mixed with a second signal having a frequency equal to (F1+F2+fr), and the difference signal is extracted. The difference signal contains the error frequency component and the reference frequency component. The reference frequency is cancelled out leaving the error frequency signal. By integrating the error frequency signal, it becomes usable as an AFC signal to control a local oscillator.

10 Claims, 4 Drawing Figures

TWO PILOT FREQUENCY CONTROL FOR COMMUNICATION SYSTEMS

BACKGROUND OF THE INVENTION

The present invention relates to a method and circuit arrangement for synchronizing the carrier frequency of a reference station with the local oscillator frequency of each of a plurality of remote stations.

While not limited to such a communication system, the instant invention is directed to the frequency control of remote stations with respect to a reference ground station in a single channel per carrier (SCPC) satellite communication system. Frequency stability is important for SCPC systems because it tends to prevent adjacent channel interference (ACI) which may occur when inadequate separation of the channels is attained; further, it tends to prevent the frequency offset of the carrier from exceeding the demodulator pull-in range. The purpose of a frequency control technique is to correct the frequency errors introduced by the frequency offset of oscillators in the transmission path, including those contributed by the satellite transponders.

Many different frequency control techniques have been used to compensate for the frequency offset which occurs during satellite transmission, and a number of these techniques employ either one or two pilot frequencies. One technique that employs two pilot frequencies is disclosed in U.S. Pat. No. 3,450,842, inventor D. E. W. Lipke, entitled, "Doppler Frequency Spread Correction Device For Multiplex Transmissions", granted June 17, 1969. In this control circuit the frequency difference between the untransmitted pilots is compared to the frequency difference between the received pilots. The reason a comparison is made between the pilots transmitted from a remote station and the local untransmitted difference in pilot frequencies is to change the local oscillator transmitter frequency so as to correct for doppler shift caused by movement of the transmitting and receiving stations relative one to the other.

In U.S. Pat. No. 4,188,579, inventor Akiyuki Yoshisato, entitled, "SSB Transceiver", granted Feb. 12, 1980, the inventor also makes use of two pilot frequencies to obtain frequency correction. In this case the pilot frequencies sent from the one terminal are recovered at the receiver of the other, "remote", terminal. The recovered pilots are used to actuate a control circuit which, in turn, controls a saw-tooth waveform generator which has a continually varying frequency, and is a part of an automatic frequency tuner. The control circuit acts to stop the voltage generator when the demodulated pilot signals have a frequency which is equal to the predetermined frequency, i.e., the absolute values of the frequencies have not been shifted. This is accomplished by the use of two pilot frequency filters which are very narrow band and thus substantially only pass the design frequency. When the pilots are off frequency the filters block transmission. A logic circuit recognizes this condition and the voltage sweep is allowed to change the frequency of the local oscillator. This will continue until the local oscillator frequency is at a frequency that positions the pilot frequencies in the passband of their respective filters. Once the pilot frequencies are passed to the logic circuit, the activity of the voltage sweep is terminated and the local oscillator is held at that frequency until the pilot frequencies are again blocked by the pilot filters.

SUMMARY OF THE INVENTION

Apparatus for deriving a frequency control signal for adjusting the frequency of the local oscillator frequency of a remote station so as to compensate for frequency errors introduced during transmission. Pilot signals of a first and second frequency are transmitted from a reference station to the remote station. These first and second frequencies are offset from the transmitted pilot frequencies by the frequency errors introduced in the transmission process; and at the remote station a first filter selects the first frequency and a second filter selects the second frequency after down conversion of the transmitted signals at the receiver. The selected frequencies are used to derive a third signal that is equal to the difference frequency thereof. Also, a fourth signal is derived from said pilot frequencies and this fourth signal includes the error frequency introduced during transmission. The third and fourth signals are combined so as to derive said frequency control signals for adjusting the frequency of the local oscillator to compensate for said frequency errors.

DETAILED DESCRIPTION

As noted in the background description pilot signals are often employed in automatic frequency control systems. These pilot signals are generated from a highly stable frequency source at a reference station and are up converted to the transmit frequency, with the normal information signal being transmitted to the remote station, where the incoming signal is down converted and the pilot tones and the error frequency associated therewith are recovered. The generation of pilot frequencies and the up conversion and down conversion processes, even including those for satellite communication, are well known and will not be considered here. Also, the adverse effects of frequency offset which occurs during transmission is well documented, and is not disclosed here. For the foregoing reasons only the control circuit employed at the remote site is illustrated as this effects considerable simplification of the drawings and the explanation necessary to an understanding of the instant invention. However, in the following discussion it will be necessary to briefly refer on occasion to some of those elements. This will be done where it is felt necessary for a more complete understanding of the various circuit functions.

Figure 1:
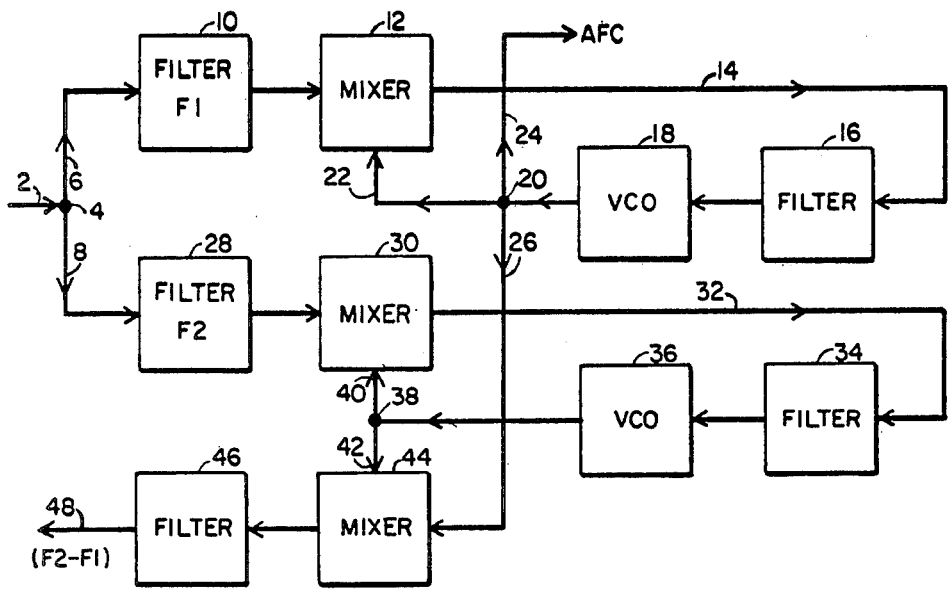
FIG. 1 is a block diagram showing a prior art technique in which two pilot frequencies are employed for the purpose of controlling the frequency of the local oscillator at a remote station.

A prior art technique is illustrated in FIG. 1. The transmitting section is not shown but as noted above, such transmitters are well known as well as the techniques by which pilot frequencies having a precise difference frequency may be generated. Of course at the transmitting site, the frequencies are passed along with the associated information signals and up converted to the radio carrier frequency for radio transmission. At the receiver they are down converted to an intermediate frequency and the demodulated pilot signals would appear on path 2. In this prior art example the frequencies F1 and F2 represent the two pilots frequencies which differ by a precise amount, (for example 5 MHz), with F2 being greater than F1. These pilot frequencies F1 and F2 are applied via path 2 junction 4 and then via paths 6 and 8 respectively to the associated filters 10 and 28 which pass only the pilot frequency indicated. Each of the pilot frequencies are applied to an associated phase locked loop comprising elements 12, 16 and 18 and paths 14 and 22, and elements 30, 34 and 36 and paths 32 and 40, respectively. The purpose of the phase locked loops is to provide replicas of each received pilot tone with improved signals to noise ratio. VCO 18 is tuned to frequency F1, and VCO 36 to frequency F2. Since phase locked loops are well known they will not be described further here. The output signals from VCO 18 and 36 are fed, respectively, to the inputs of mixer 44 via junctions 20 and 38 and paths 26 and 42. The output of mixer 44 is applied to selection filter 46, which passes the difference frequency of the two pilot tones on path 48. The difference frequency signal has the same stability as the highly stable reference signal used in the reference station to generate the pilot tones; and the two pilot tones have, as a consequence, provided a means for the dissemination of the reference frequency. One of the pilot tones is fed via junction 20 and path 24 to a conventional AFC circuit.

Figure 2:
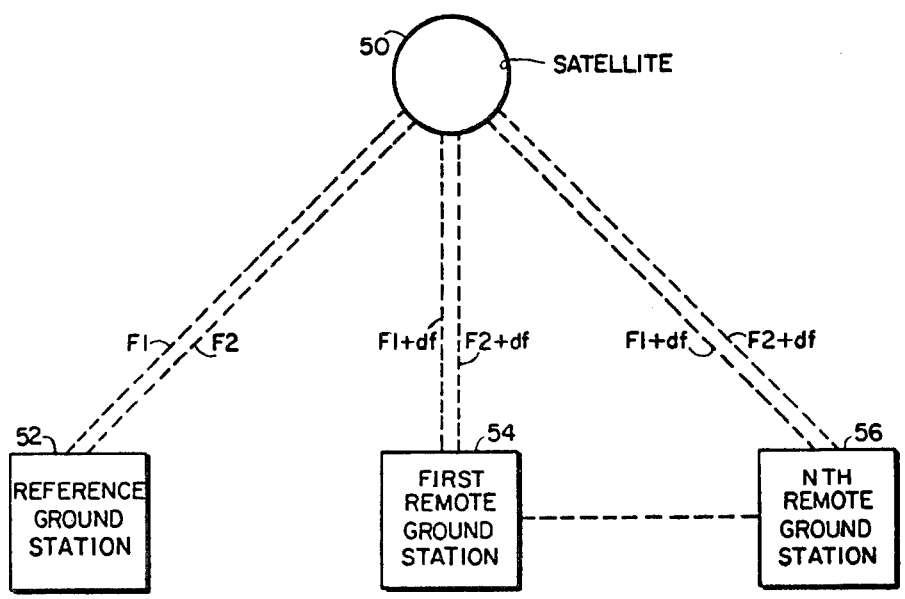
FIG. 2 is a schematic representation of a satellite communications system in which there is a reference ground station, a satellite and a number of remote ground stations; and it illustrates the error effect (df) introduced in the pilot frequencies during transmission.

Referring now to FIG. 2 the environment in which the present invention was initially designed to operate is illustrated. The two pilot frequencies F1 and F2 are generated in the reference ground station 52. This ground station 52 may be located relatively near a major metropolitan area and will be arranged to provide communication between customers in that area with customers in remote locations via the satellite 50. The pilot frequencies F1 and F2 are derived from a stable frequency source having a predetermined ratio between the frequency difference of the two pilot tones and the absolute frequency of any one of the tones. This may be expressed as follows:

$$F2 - F1 = (k1/n1)(F1) \quad (1)$$

and $$F2 - F1 = (k2/n2)(F2) \quad (2)$$

where k1, k2, n1 and n2 are integers. The shift oscillators in the transmission path, including those in the satellite, introduce a frequency offset df at the receiver which is the resultant of the individual oscillator frequency errors. This offset df is illustrated in the path from the satellite 50 to the first remote ground station 54 in FIG. 2. As may be seen in FIG. 2 the frequency offset, frequency error df, is the same for signals transmitted from the reference station to each of the ground stations. However, the error introduced in the down conversion process by each local oscillator may be different.

Reverting back to the generation of the pilot tones it should be noted that the following conditions also apply:

$$F1 = (k1)(fr) \quad (3)$$

$$F2 = (k2)(fr) \quad (4)$$

where
fr is a reference frequency and
k1 and k2 are related as $$k2 = k1 + k \quad (5)$$

Figure 3:
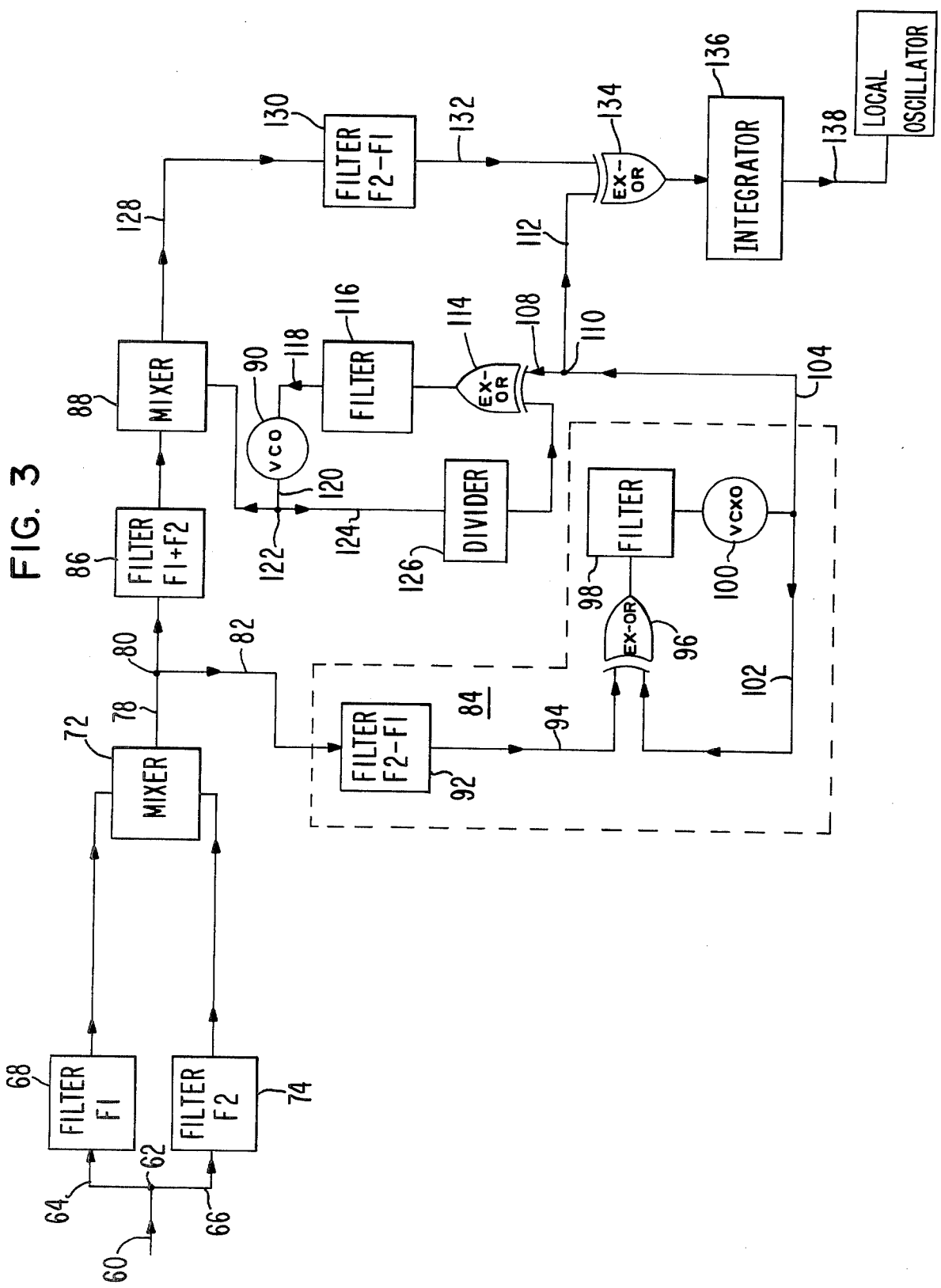
FIG. 3 is a block diagram of a preferred embodiment of the instant invention in which an automatic frequency control system, in response to the frequency error introduced in transmission, provides a control signal for correction of the oscillator at a remote ground station.

The first pilot frequency F1 will be taken, for purposes of illustration, as being equal to 70 MHz and the reference frequency fr as 5 MHz; and, the second pilot frequency F2 will be taken as 75 MHz. At the first remote receiver, the received pilot frequencies (F1' and F2') will have shifted. F1' will be equal to 70 MHz plus the error frequency df, i.e., $F1 + df = F1'$; and the F2' will be equal to 75 MHz plus df, i.e., $F2 + df = F2'$. These two received pilots appear on path 60 and, as shown in FIG. 3, pass via junction 62 and paths 64 and 66, respectively, to bandpass filters 68 and 74. The original pilot frequencies plus their error, or offset frequencies, are selected from those present and passed to the one and other inputs of mixer 72. Mixer 72 essentially provides at output path 78 the sum and difference of the frequencies applied to the one and other inputs. This may be expressed as follows:

$$F2' + F1' = F2 + F1 + 2df \quad (6)$$

$$F2' - F1' = F2 - F1 \quad (7)$$

From equations 6 and 7, it will be noted that the difference frequency on path 78 will not include the frequency error, or offset, as the difference will be unchanged. This is true with respect to the frequency error introduced by the various oscillators in the transmission system. However, it should be noted that a frequency error will be introduced where the effects of a doppler shift are introduced. With respect to normal ground communication systems a doppler frequency shift is not introduced. Also, with respect to synchronous satellite communications systems, the movement of the satellite is so slight with respect to the distance to the earth that any effect on the frequency control system is negligible.

The difference frequency component $F2' - F1'$ as the control signal input to phase locked loop 84. Filter 92 selects the difference frequency signal to provide a control input to Exclusive OR-gate 96. The voltage controlled crystal oscillator 100 operates at the reference frequency fr which, in this example, is 5 MHz. The output of the voltage controlled crystal oscillator 100 is applied to the second input of Exclusive OR-gate 96, which operates here as a phase detector. The phase error signal then is passed through the phase locked loop control filter 98 and thus closes the phase locked loop. The oscillator output frequency now conforms with that of the reference frequency, fr, in the reference ground station, and is applied via path 104, and junction 110, to one input of Exclusive OR-gate 114.

Referring back to the output of mixer 72 it should be recalled that the sum frequencies as well as the difference frequencies, will appear at path 78. These frequencies will pass via junction 80 to an input of filter 86 which passes only the sum frequencies including the error frequencies which were introduced in the transmission process. In our example case this will be a 145 MHz frequency plus twice the error frequency (i.e. 2df), as expressed in equation (6).

The other frequency, which is applied to the mixer 88, is generated in voltage controlled oscillator 90. VCO 90 is selected to generate a frequency which is equal to the sum frequency of the pilot tones plus or minus the reference frequency. In our example, the VCO 90 generated frequency is selected to be equal to 150 MHz, i.e., the sum frequency of the original pilot frequencies plus the reference frequency. This generated frequency is essentially controlled by the voltage controlled crystal oscillator 100. The 150 MHz frequency is applied to divider 126 which divides the input frequency down by 30 to obtain the same, or substantially the same frequency as is obtained from oscillator 84, i.e., 5 MHz. It is this feedback loop, controlled essentially by the voltage controlled crystal oscillator 100, that provides the stability for the voltage controlled oscillator 90. The output of the mixer 88 again provides sum and difference frequencies.

$$(F1'+F2') \pm (F1+F2+fr) \quad (8)$$

or $$(F1+F2+2df)+(F1+F2+fr) \quad (9)$$

As we have shown above, taking the difference results in a 5 MHz reference frequency plus a frequency that is twice the offset, i.e., 2df. This difference frequency is selected by filter 130 and passed along path 132 to one input of Exclusive OR-gate 134. The other input to Exclusive OR-gate 134 is the 5 MHz reference frequency obtained from the voltage controlled crystal oscillator 100, which is passed along path 108 junction 110 path 112. Because the Exclusive OR-gate 135 will provide an output signal only when the inputs are unlike, it is the difference frequency which causes an output control signal. This control signal is applied to filter integrator 136 to obtain an automatic frequency control (AFC) signal that is based upon the error offset frequency introduced during transmission. This AFC signal is used in the control input of the local oscillator, as is well known, to provide the desired frequency correction.

Figure 4:
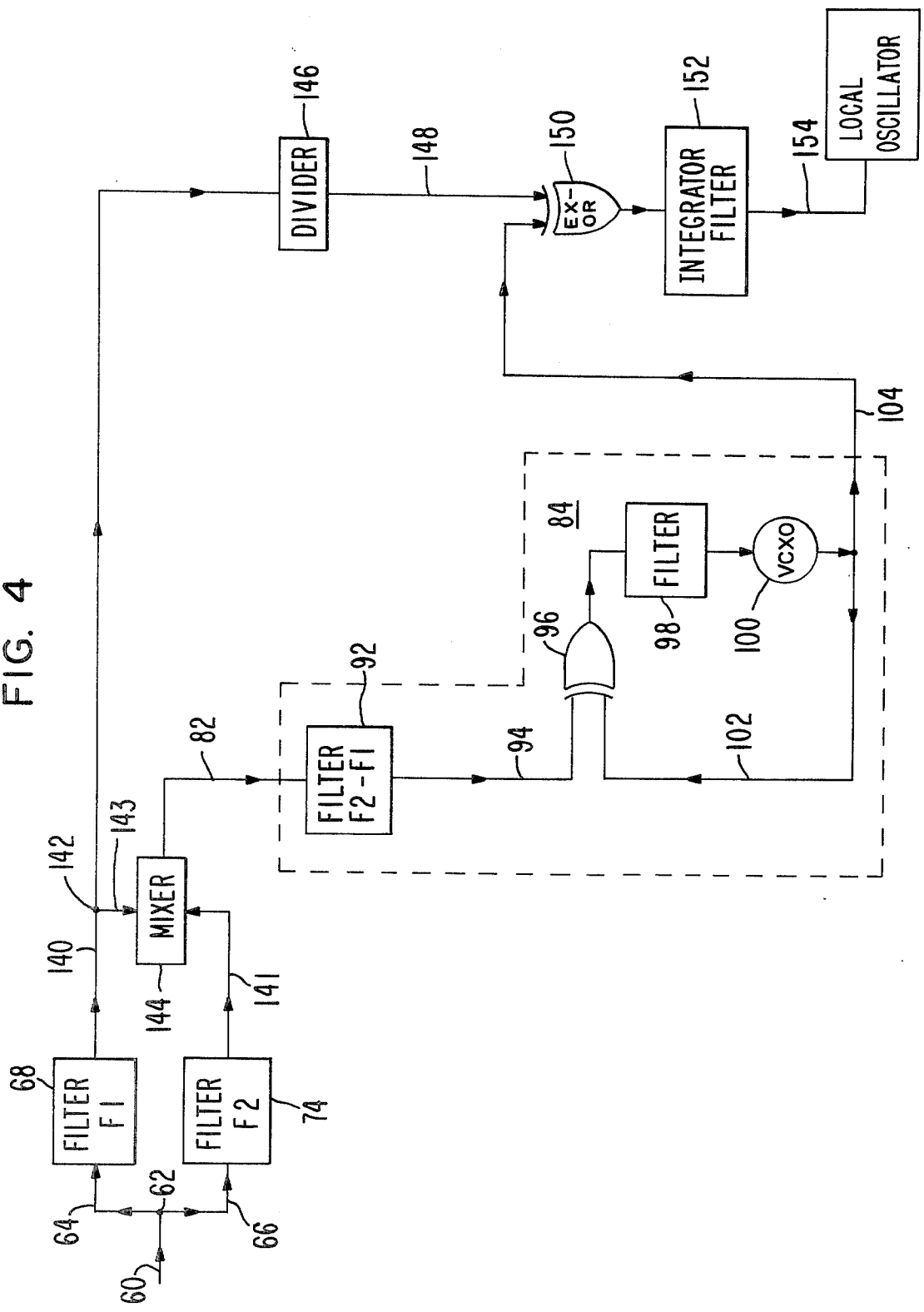
FIG. 4 is another embodiment of the invention in which an automatic frequency control system may be employed at a remote ground station.

A second embodiment of the invention is shown in FIG. 4. Note that the numbers identifying similar parts have been retained and are used on a number of those as shown in FIG. 3. In particular the voltage controlled crystal oscillator portion designated as 84 and the elements thereof have been similarly named and their operation is as has been described hereinabove. Also the input at path 60 junction 62 and paths 64 and 66 to filters 68 and 74 provide a similar functions as have been described. Mixer 144 has been redesignated, not because it provides a different function, but because it is here used only to obtain the difference frequency which is applied via path 82 to oscillator circuit 84. The frequency along path 140 includes the first pilot frequency F1 plus the error or offset frequency df introduced during transmission and this is applied to divider 146. If we use the same frequencies as were used for example in FIG. 3 it will be noted that divider 146 should be a divide by fourteen as this will then provide a frequency of 5 MHz, 70/14, as well as the frequeny error divided by fourteen, df/14, at the output on path 148 and these are applied via path 148 to one input of the Exclusive OR-gate 150. As before, the output of the voltage controlled crystal oscillator 100 is applied directly via path 104, as the output frequency of the voltage controlled crystal oscillator is 5 MHz. Again, the output of Exclusive OR-gate 150 will be proportional to the frequency error which was introduced during transmission. The frequency error, appearing on path 148, is then integrated in integrator filter 152 to provide the automatic frequency control (AFC) voltage on path 154. This AFC is then used to control the local oscillator, which is not shown. Such oscillators are well known and may be similar to the voltage controlled oscillator described herein. The AFC voltage would be applied to the frequency control input of the oscillator, so as to obtain the desired correction.

What is claimed is:

1. Apparatus for deriving a frequency control signal for controlling the frequency of a local oscillator at a remote station to compensate for a frequency error introduced during transmission to a pair of pilot signals of a first frequency and a second frequency transmitted from a reference station to said remote station, said first and second frequencies being shifted by said frequency error during transmission said apparatus comprising: a first and second filter means separating said pilot signals into first and second pilot signals; first means coupled to said first and second filter means for deriving from said first and second pilot signals a third signal having a frequency equal to the difference in frequency of said first and second pilot signals; second means for deriving from said pilot frequencies a fourth signal which includes said frequency error introduced during transmission; and, third means for deriving from said third and fourth signal said frequency control signal for adjusting said local oscillator frequency to compensate for said frequency error.

2. Apparatus as set forth in claim 1 wherein said first means comprises:
   mixer means for deriving the sum and the difference frequency of said first and second pilot signals said sum frequency including twice the frequency error;
   a third filter for selecting the difference frequency from the signals present at the output of said mixer means;
   a voltage controlled crystal oscillator, having a voltage controlled feedback loop, said oscillator operating at the frequency of said third signal which is substantially equal to said difference frequency;
   means for deriving a control voltage from said difference frequency; and
   means for injecting said control voltage into the control loop of said voltage controlled crystal oscillator to adjust the frequency thereof.

3. Apparatus as set forth in claim 1 wherein said first means comprises:
   mixer means for deriving a fifth frequency which is equal to the difference frequency, and a sixth frequency which is equal to the sum of said first and second pilot signals plus twice the frequency error;
   a third filter for selecting said fifth frequency from those present at the output of said mixer means; and
   a fourth filter for selecting said sixth frequency from those present at the output of said mixer means;
   a voltage controlled crystal oscillator having a voltage control feedback loop and operating at said third frequency; said third frequency being sustantially equal to said fifth frequency;

means for deriving a first control voltage from said fifth frequency output from said third filter; and means for injecting said first control voltage into the frequency control loop of said voltage controlled crystal oscillator to adjust the frequency thereof.

4. Apparatus as set forth in claim 3 wherein said second means comprises:

a second mixer having as one input the sum output selected by said fourth filter and having a second input; and a voltage controlled oscillator (VCO) having a control input derived from the output of said voltage controlled crystal oscillator (VCXO), said VCO providing at an ouput a seventh frequency which differs from said sixth frequency by an amount equal to the difference frequency of said pilots; said seventh frequency being applied to the second input of said second mixer, whereby sum and difference frequencies of said sixth and seventh frequencies are provided at the output of said second mixer, said sum and difference frequencies including said frequency error introduced in transmission.

5. Apparatus as set forth in claim 4 including a fifth filter for selecting said difference frequency from those present at the output of said second mixer.

6. Apparatus as set forth in claim 5 wherein said third means comprises:

gating means having a first input adopted to receive the output frequency from said voltage controlled crystal oscillator (VCXO) and a second input adapted to receive the frequency difference output from said fifth filter and providing an output pulse only when the inputs are unlike; and means for integrating the output pulse from said gating means to obtain said frequency control signal.

7. Apparatus for deriving a frequency control signal for controlling the frequency of a local oscillator at a remote station to compensate for a frequency error introduced during transmission to a pair of pilot signals of a first frequency and a second frequency transmitted from a reference station to said remote station, said first and second frequencies being shifted by said frequency error during transmission said apparatus comprising: a first and second filter means separating said pilot signals into first and second pilot signals; first means coupled to said first and second filter means for deriving from said first and second pilot signals a third signal having a frequency equal to the difference in frequency of said first and second pilot signals; second means for deriving from said first pilot signal a fourth signal which includes said frequency error introduced during transmission; and, third means for deriving from said third and fourth signal said frequency control signal for adjusting said local oscillator frequency to compensate for said frequency error.

8. Apparatus as set forth in claim 7 wherein said first means comprises:

mixer means for deriving the sum and the difference frequencies of said first and second pilot signals, said sum frequency including twice the said frequency error;

a third filter for selecting the difference frequency from the signals present at the output of said mixer means;

a voltage controlled crystal oscillator, having a voltage controlled feedback loop, said oscillator operating at the frequency of said third signal which is substantially equal to said difference frequency;

means for deriving a control voltage from said difference frequency; and means for injecting said control voltage into the control loop of said voltage controlled crystal oscillator to adjust the frequency thereof.

9. Apparatus as set forth in claim 8 wherein said second means comprises a frequency divider for operating on said first pilot signal.

10. Apparatus as in claim 9 wherein said third means comprises:

gating means having first and second inputs adapted to receive said third and fourth frequencies, respectively, and to provide an output signal only when the inputs are unlike; and means for integrating the output signal from said gating means to obtain said frequency control signal.

* * * * *